No. 868,685. PATENTED OCT. 22, 1907.
L. H. MULLIKIN.
COMBINED LOCK AND LATCH.
APPLICATION FILED MAY 22, 1906.
3 SHEETS—SHEET 1.
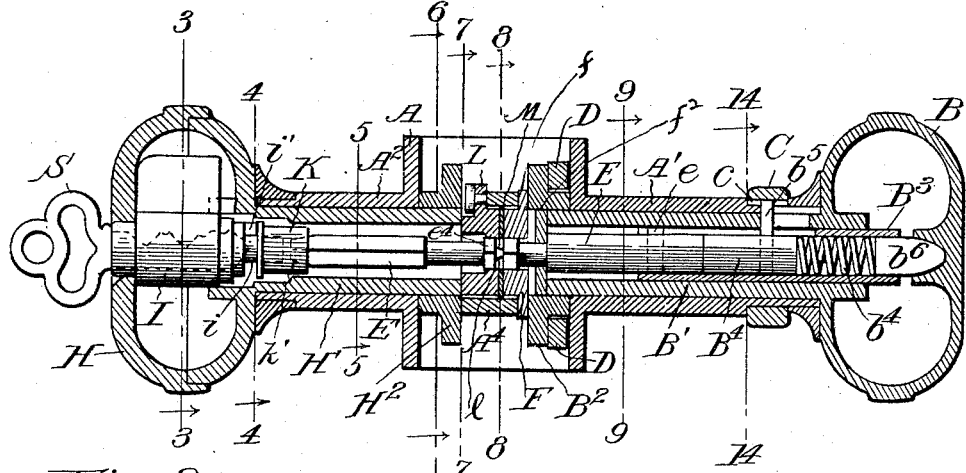
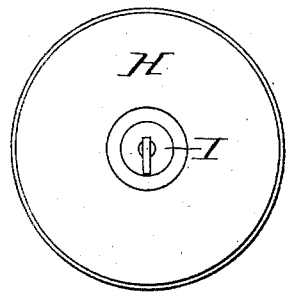
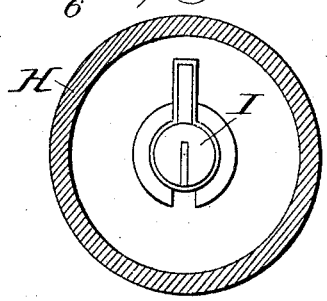
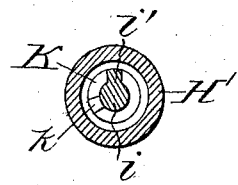
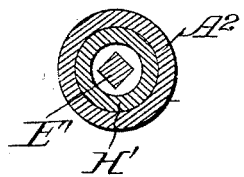
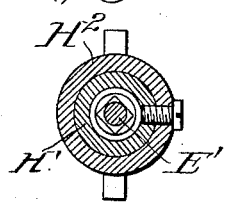
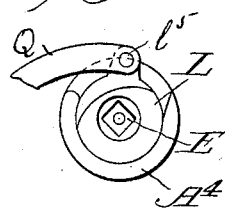
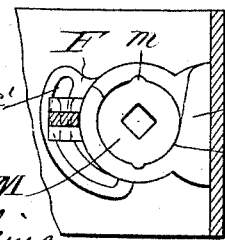
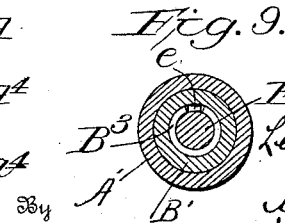
Witnesses
C. H. Walker
Albert Popkins
Inventor
Lewis H. Mullikin
By Geo. H. Evans
Attorney

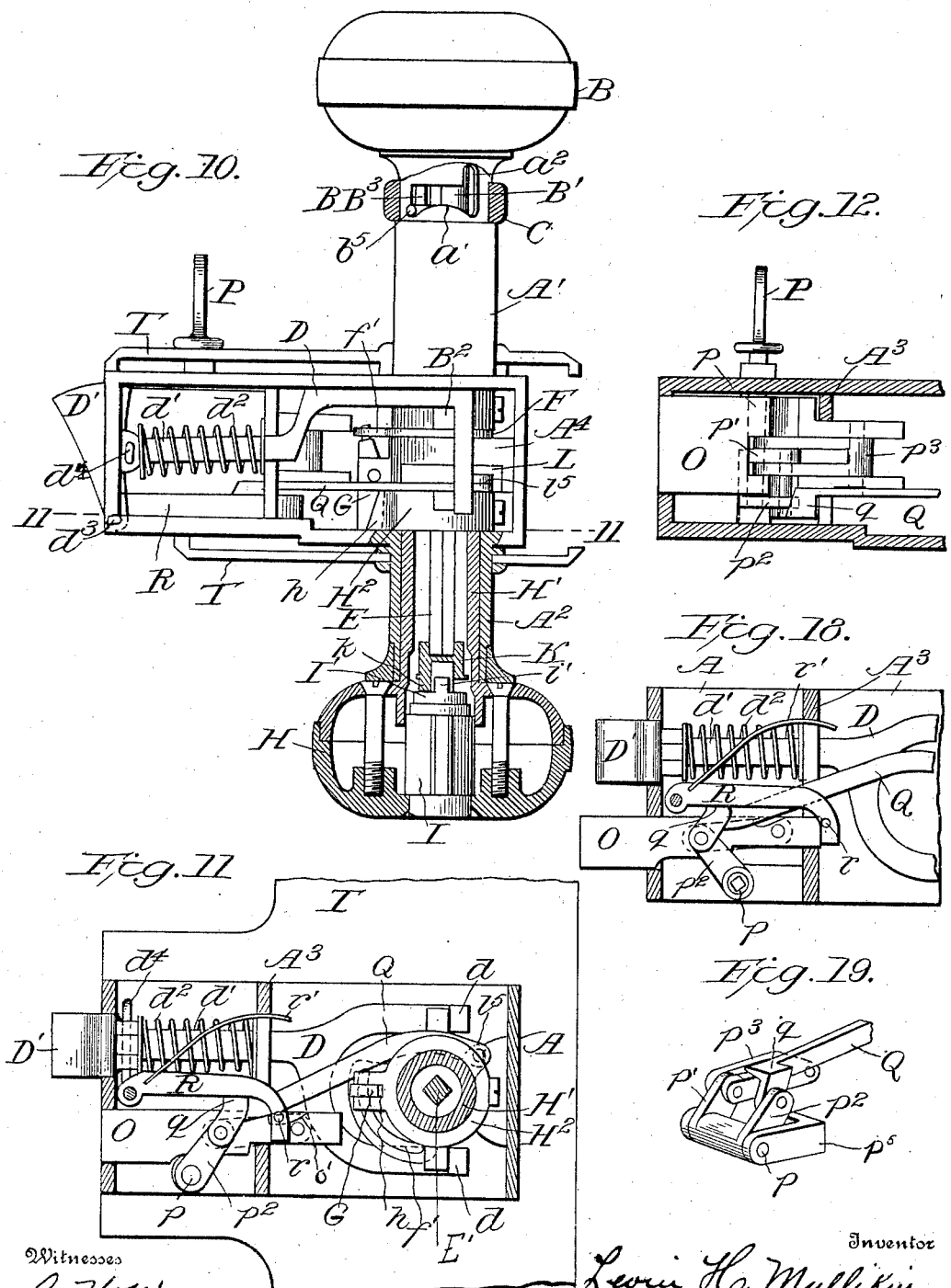

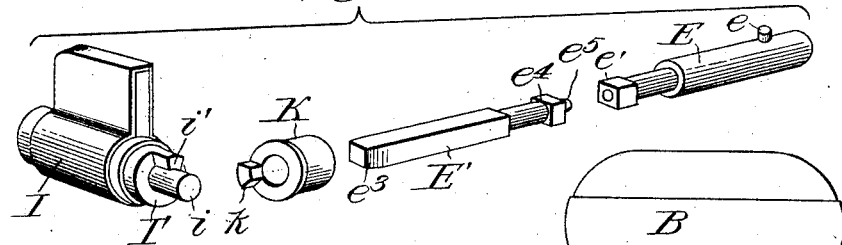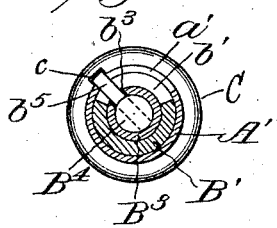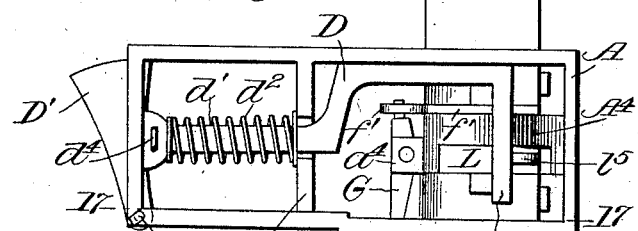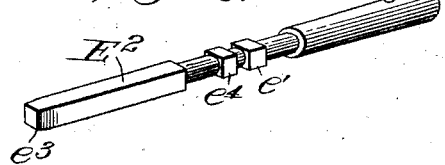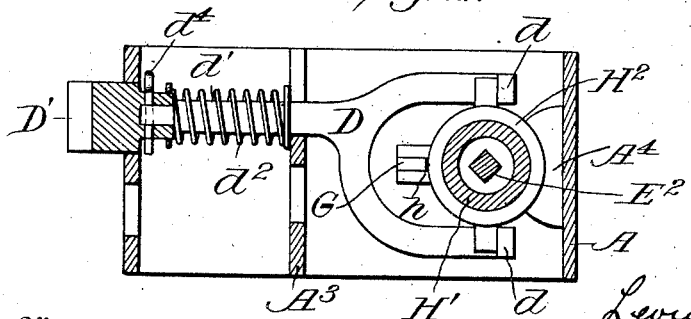

UNITED STATES PATENT OFFICE.

LEVIN H. MULLIKIN, OF TRAPPE, MARYLAND, ASSIGNOR TO P. & F. CORBIN AND RUSSELL & ERWIN MANUFACTURING COMPANY, BOTH OF NEW BRITAIN, CONNECTICUT, CORPORATIONS OF CONNECTICUT.

COMBINED LOCK AND LATCH.

No. 868,685.      Specification of Letters Patent.      Patented Oct. 22, 1907.

Application filed May 22, 1906. Serial No. 318,151.

*To all whom it may concern:*

Be it known that I, LEVIN H. MULLIKIN, a citizen of the United States, residing at Trappe, in the county of Talbot and State of Maryland, have invented certain new and useful Improvements in Combined Locks and Latches, of which the following is a specification.

My invention relates to combined locks and latches of the type shown in my Patent No. 840,007, dated Jany. 1, 1907.

The principal object of this invention is to provide for locking the latch by the key from the outside should the person forget to turn the ring at the inner knob shank before leaving the room. This object I accomplish by the mechanism shown in the accompanying drawings, in which—

Figure 1 is a longitudinal vertical section through my improved lock; Fig. 2 is an end elevation of the outside knob; Fig. 3 is a section on line 3—3 Fig. 1; Fig. 4 is a section on line 4—4 Fig. 1; Fig. 5 is a section on line 5—5 Fig. 1; Fig. 6 is a section on line 6—6 Fig. 1; Fig. 7 is a side elevation of the bolt throwing collar and a portion of the actuating rod, on line 7—7 Fig. 1; Fig. 8 is a side elevation on line 8—8 Fig. 1, of the cam and section or the locking lever for the outside knob; Fig. 9 is a section on line 9—9 Fig. 1; Fig. 10 is a plan in partial horizontal section of the lock; Fig. 11 is a side elevation in partial section on line 11—11 Fig. 10; Fig. 12 is a detail plan view of the bolt and its actuating mechanism, the casing being in section; Fig. 13 is a perspective of the two part actuating rod for the latch and bolt and the devices by which it is operated from the key, the parts being separated; Fig. 14 is a section on line 14—14 Fig. 1; Fig. 15 is a plan view of a locking-latch with the bolt omitted; Fig. 16 is a perspective of the actuating rod employed in lieu of the two part rod; Fig. 17 is a section on line 17—17 of Fig. 15. Fig. 18 is a view similar to Fig. 11, but showing the bolt projected; and Fig. 19 is a perspective of the bolt actuating mechanism and the bracket on which the rock shaft is mounted.

A designates the lock case of general open rectangular form, provided at opposite sides with tubular extensions or hubs A′, A² and provided with a transverse partition A³. The rear wall of the case is provided with a central inwardly projecting bracket A⁴ having an opening $a^6$ in horizontal alinement with the hubs A′, A².

The inner knob B is provided with a tubular shank B′, extending into the lock case A and there provided with a two armed rocker B² to actuate the latch retracting yoke D, as will be further described.

Within the tubular knob shank B′ is a longitudinally slotted tube B³ and in the outer end of this tube B³ is a plunger B⁴ pressed inwardly by a spring $b^4$ which bears at its outer end against a plug $b^6$ in the end of said tube. Extending at right angles from the plunger B⁴ is a pin $b^5$ which passes through the longitudinal slot $b^3$ in the tube B³, and also through a transverse slot $b'$ in the knob shank B′ into a cam shape slot $a'$ in the hub A′, see Figs. 1, 10, 14.

The projecting end of the pin $b^5$ is received within a transverse groove $c$, in the inner wall of a ring C mounted to turn on the hub A′ adjacent to the knob B. The left hand end of the slot $a'$ has an extension $a^2$ towards the knob. When the ring is turned to the right the pin $b^5$ will be carried to the position shown in Fig. 10 where it will be held by the pressure of spring $b^4$, but when the ring C is turned in the opposite direction the pin $b^5$ will be carried over in line with groove $a^2$. In this position by first removing the screw $b^{10}$, which secures the knob-shank B¹ to the rocker B², the knob-shank may be pulled out beyond the ring C, to bring the pin $b^5$ into the slot $a^2$, when it may be pulled out to separate the parts, or in this position the pin may be inserted when the parts are being assembled. By having the ring mounted to turn on the hub A¹ independent of the knob-shank B¹ the rotation of the knob-shank has no effect whatever on the ring, which is held from accidental turning by the pin $b^5$ held in end of slot $a^1$, by the spring, as before described. These parts are all substantially as shown and described in my said patent as are the locking bolt O, and its actuating devices hereinafter described.

Within the inner end of the tube B³ is an actuating rod E abutting against the plunger B⁴ and having a pin $e$ which projects into the slot $b^3$ of the tube B′ to prevent it from turning in the tube when the tube is rotated by turning the ring C. The inner end of this rod E is reduced and has a squared extremity $e'$ which enters and slides within a squared opening $f$ in a collar F which rotates in the bracket A⁴ and is provided with a flange having a cam slot $f'$. The reduced portion of the rod E is provided with a guide collar $f^2$ which works in the central opening of the rocker B² as shown in Fig. 1.

G is a locking lever pivoted between the ends in ears $a^4$ on the front end of the bracket A⁴, see Figs. 8, 10 and 11, one end of the lever entering the cam slot $f'$ of collar F and the other end adapted to enter a notch $h$ in the yoke-actuating rocker H² of the outside knob spindle H′ which is mounted in the outside case-extension or hub A², see Figs. 1 and 10. It will be seen therefore that when the ring C is turned to the position shown in Fig. 10, the rod E will, through its squared portion $e'$, have turned the cam $f$ down, see Figs. 8 and 10, and so have thrown the free end of lever G into the notch $h$, in the outside rocker $H^2$. This rocker will thus be locked and rendered inoperative by the outside knob H until the reversal of the ring C. In order that this reversal may be effected from the outside, I provide the outer knob H with a rotary key-hole barrel I, which being of the usual Yale type, need not be further described. The inner end of the barrel I is provided with a longitudinally projecting round extension $i$ and a lug $i'$. This extension $i$ receives a collar K also provided with a lug $k$ so that by turning the barrel I the collar K may be rotated in either direction. The inner end of the collar K has a squared opening $k'$ in which fits the squared end $e^3$ of the other section E′ of actuating rod E. The inner end of the rod section E′ is provided with a squared portion $e^4$ entering a collar L having a squared opening to receive it. The collar L turns in the bracket $A^4$ and its squared opening $l$ registers with the squared opening in the collar F; the two collars L, F, being spaced apart by a washer M held from turning by two lugs $m$, $m$, entering notches in the bore of bracket $A^4$, see Figs. 1 and 8. The rod section E′ terminates at its inner end in a short longitudinal projection $e^5$ which engages the inner end of the other rod section E, see Fig. 1. It will be seen therefore that when the cam collar F has been turned to throw the locking lever G into the notch in the outside knob rocker and it is desired to release said rocker, it will only be necessary to insert the key in the barrel I, push the barrel inwardly far enough to bring the squared portion $e^4$ into the cam carrying collar F when by turning the key the barrel I and collar F will be rotated and the lever G withdrawn from the rocker $H^2$. By now turning the outside knob the latch may be retracted.

The latch yoke D has two horizontal arms $d$, $d$, at its rear ends which extend behind both arms of the rockers $B^2$, $H^2$, see Figs. 10 and 15 and the shank $d'$ is surrounded by a spring $d^2$ which lies between the front of the case and the partition $A^3$ in which the yoke shank slides. The latch D′ is pivoted at $d^3$ to the case and is pivoted at $d^4$ to the yoke shank.

The bolt O, is mounted in the lower part of the case and is operated from the inside by a rotary thumb piece P the shaft $p$, of which is mounted in a bracket $p^5$ and carries two arms $p'$, $p^2$, and the arm $p'$ is pivotally connected to the forked rear end of the bolt by forked link $p^3$ by which the bolt is operated. The arm $p^2$ is pivotally connected to the collar L, at $l^5$ by means of a connecting rod Q, so that when the collar L is rotated by a key inserted in the barrel I with the parts in the position shown in Fig. 1 the rod Q will pull on the arm $p^2$ and retract the bolt as shown in Fig. 11. An opposite movement will of course project the bolt. This connecting rod Q has a laterally projecting offset $q$ which underlies a pivoted detent R adapted to lock the bolt against retraction. The detent R is pivoted to the case at its forward end just over the forward end of the bolt O and has a downwardly curved rear end which carries a laterally projecting pin $r$ which rests in an inclined recess $o'$ in the upper edge of the bolt, when the bolt is retracted, but when the bolt is projected by the forward movement of the rod Q, the offset $q$ thereof will raise the detent R and when the rod and arm $p^2$ reach their forward throw the offset $r$ will again descend and allow the detent R to be forced down by its spring $r'$ and the pin $r$ will drop behind the rear end of the bolt and prevent it from being retracted until rod Q is pulled to the rear.

When the latch D′ is locked and the bolt O projected the outside knob H, cannot be turned and in order to open the door the key S must be inserted as in Fig. 1 and not pushed in hard enough to slide the rod section E′. By now turning the key to the right the lug $i$ will engage the lug $k$ and rotate the collar K which in turn will rotate the rod section E′ the squared end $e^4$ of which will rotate the collar L and pull the rod Q inwardly which rod will lift the detent R and rock the arms $p^2$, $p'$ inwardly and so retract the bolt. By now pushing on the key S, and causing the rod E′ to slide inwardly until its squared end $e^4$ passes beyond the washer M into the squared opening in the inner collar F the said collar F may be rotated to cause its cam $f$ to release the latch lever H from the recess $h$ in the outside rocker $H^2$; the turning of the collar F rotating rod E, which has been pressed inwardly against the action of its spring, and the rod E in turn rotating the tube or sleeve $B^3$ which through pin $b^5$ will turn ring C back to its opposite position. When the key is removed the spring $b^4$ will press the rod sections E, E′, and the key barrel I outward to their normal positions. If the latch D′ is not locked and the bolt only is projected then of course the rod section E′ is only rotated and not pressed in but if the bolt is retracted and the latch locked then the key is pressed inwardly to move the squared end $e^4$ into the collar F before turning said key. By reversing the turning of the key the bolt may be thrown and the latch may be locked from the outside of the door as in its normal inserted position the key controls the locking bolt and in its pressed-in position it controls the mechanism that locks the outside knob against rotation.

Where a locking bolt is not considered necessary as in Figs. 15, and 17, the rod $E^2$ is made in a single piece instead of in two sections E, E′, since in this construction there is no need for but one as the collar L has now no function. In fact it may be omitted entirely and only the single squared portion $e'$ be employed.

T and T′ are the inner and outer finishing plates which lie against the surfaces of the door.

I do not restrict myself to the particular mechanism herein, as the same may be considerably varied without departing from the spirit of my invention.

What I claim is:

1. The combination with a latch and its knob actuated retractive devices, of a locking device for the outside knob, a rod extending from knob to knob independent of both knobs and provided with means to actuate said locking device, a key controlled connection between the outside knob and said rod and a ring concentric with the inside knob shank and connected with said rod for rotating it.

2. The combination with a latch and its knob actuated retracting devices, of a locking lever to engage and lock the outside knob mechanism, a rotary cam device engaging said lever to operate it, a rod extending between the two knob mechanisms independent of both knob mechanisms and adapted to rotate said cam, a rotary ring concentric with the inner knob spindle and connected to said rod, and a key actuated barrel in the outside knob and operatively connected with the said rod.

3. The combination with a latch and its knob actuated retracting devices, of a locking lever for the outside knob shank, a rod extending between the knobs and provided between its ends with a collar having a flange provided with a cam slot engaging said locking lever, a key actuated means in the outside knob for the rod, and an actuating ring concentric with the inside knob shank for rotating said rod.

4. The combination with a latch and its knob actuated retracting devices, a locking device for the outside knob shank, a two part rotary and sliding rod between the two knob shanks, an operating means for said locking device on the inner end of the inner rod section, means at the inner knob for rotating the inner rod section, a key actuated means in the outer knob for rotating and sliding the outer rod section, a locking bolt, connections between the inner end of the outer rod section and the said locking bolt for actuating it from said key actuated means, and means at the inner side of the lock for actuating the locking bolt from the inside of a room whereby on first turning the key the bolt will be retracted and then on pushing in the key actuated means the outer rod section will engage with said operating means for the locking device which may then be actuated by turning the key to rotate said outer rod section.

5. The combination with a latch and its knob actuated retracting means, a locking device for the outside knob shank, a two part rotary and sliding rod between the two knob shanks, an operating collar at the inner end of the inner rod section operatively connected with said locking device, an operating ring concentric with the inner knob shank and connected with said rod section, a second collar on the adjacent end of the outer rod section, a key actuated barrel in the outer knob operatively connected with the outer end of the outer rod section to rotate it and slide it past its collar into engagement with the collar at the inner end of the inner rod section, a bolt, a connecting rod connecting the bolt with the said second collar and means at the inner side of the lock and connected with the said bolt for operating it from within the room.

6. The combination with a latch and its knob actuated retracting means, a locking device for the outside knob shank, two rotary collars supported in a bearing between the two knob shanks and having squared apertures, a two part rod having squared inner ends mounted in said apertures; the outer rod section being movable inwardly to engage the aperture in the inner collar and the inner rod section having a spring pressing it against the outer rod section, a rotary and sliding key operated device engaging the outer end of the outer rod section to rotate it and its bolt operating collar or move it into engagement with the other collar to rotate the latter, a locking bolt operatively connected with the outer collar, a locking lever for the outer knob shank and operatively connected with the inner collar, and means at the inner knob shank for rotating the inner rod section.

7. A lock and latch comprising a suitable casing, a bolt and a latch mounted therein, tubular hubs on opposite sides of the casing, knobs having tubular shanks in said hubs and provided at their inner ends with rockers for operating the latch, rotary collars mounted in a bearing intermediate the two knob shanks and having registering squared openings, a longitudinally slotted tube in the inner knob shank, a spring pressed plunger in said tube provided with a pin extending out through slots in the shank and hub, a ring on the hub having a transverse internal slot receiving the end of said pin, a sliding and rotating rod section in said slotted tube and having a pin projecting into said slot and a squared end entering the inner one of said rotary collars, a locking lever operated by said collar to lock the outside knob shank rocker, a sliding and rotating rod section in the outer knob shank with its inner squared end normally engaging the outer one of said rotary collars but adapted when pushed in to engage the other collar and rotate it, a key barrel sliding and turning in the outer knob, a collar on the outer end of said rod section, the adjacent ends of said collar and key barrel having projections, a connecting rod connecting the outer one of said rotary collars with the locking bolt, and means for operating the bolt from the inside of a room.

In testimony whereof I affix my signature in presence of two witnesses.

LEVIN H. MULLIKIN.

Witnesses:
GEO. F. NICKERSON,
JOHN C. ANDERSON.